United States Patent
Zhang et al.

(10) Patent No.: US 11,836,368 B2
(45) Date of Patent: *Dec. 5, 2023

(54) LOSSY DATA COMPRESSION

(71) Applicant: Imagination Technologies Limited, Kings Langley (GB)

(72) Inventors: Linling Zhang, Kings Langley (GB); Simon Fenney, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,454

(22) Filed: Nov. 29, 2022

(65) Prior Publication Data

US 2023/0089878 A1    Mar. 23, 2023

Related U.S. Application Data

(63) Continuation of application No. 16/872,527, filed on May 12, 2020, now Pat. No. 11,531,479, which is a continuation of application No. 15/383,853, filed on Dec. 19, 2016, now Pat. No. 10,691,360.

(30) Foreign Application Priority Data

Dec. 18, 2015 (GB) ..................... 1522449

(51) Int. Cl.
*G06F 3/06* (2006.01)
*H04N 19/645* (2014.01)
*H04N 19/34* (2014.01)

(52) U.S. Cl.
CPC ............ *G06F 3/064* (2013.01); *G06F 3/0608* (2013.01); *G06F 3/0673* (2013.01); *H04N 19/34* (2014.11); *H04N 19/645* (2014.11)

(58) Field of Classification Search
None
See application file for complete search history.

(56) References Cited

U.S. PATENT DOCUMENTS

| | | | |
|---|---|---|---|
| 4,679,094 A | 7/1987 | Rutherford et al. |
| 5,367,383 A | 11/1994 | Godshalk et al. |
| 5,818,877 A | 10/1998 | Tsai et al. |
| 5,991,454 A | 11/1999 | Fowler |
| 6,125,201 A | 9/2000 | Zador |
| 6,205,252 B1 | 3/2001 | Nguyen et al. |
| 6,266,450 B1 | 7/2001 | Yip et al. |

(Continued)

FOREIGN PATENT DOCUMENTS

| | | |
|---|---|---|
| GB | 2451911 B | 3/2010 |
| WO | 2006/065482 A2 | 6/2006 |

*Primary Examiner* — Christopher D Birkhimer
(74) *Attorney, Agent, or Firm* — Potomac Law Group, PLLC; Vincent M DeLuca

(57) ABSTRACT

A lossy method of compressing data, such as image data, which uses wrap-around wavelet compression is described. Each data value is divided into two parts and the first parts, which comprise the most significant bits from the data values, are compressed using wrap-around wavelet compression. Depending upon the target compression ratio and the compression ratio achieved by compressing just the first parts, none, one or more bits from the second parts, or from a data value derived from the second parts, may be appended to the compressed first parts. The method described may be lossy or may be lossless. A corresponding decompression method is also described.

20 Claims, 11 Drawing Sheets

(56) References Cited

U.S. PATENT DOCUMENTS

| | | |
|---|---|---|
| 6,289,128 B1 | 9/2001 | Allen |
| 6,301,368 B1 | 10/2001 | Bolle et al. |
| 6,348,881 B1 | 2/2002 | Buer |
| 6,501,859 B1 | 12/2002 | Kajiwara |
| 6,865,291 B1 | 3/2005 | Zador |
| 7,079,051 B2 | 7/2006 | Storer et al. |
| 7,236,649 B2 | 6/2007 | Fenney |
| 8,116,579 B2 | 2/2012 | Fenney et al. |
| 11,294,591 B2 | 4/2022 | Wells et al. |
| 2001/0024530 A1 | 9/2001 | Fukuhara et al. |
| 2002/0003905 A1 | 1/2002 | Sato et al. |
| 2003/0063810 A1 | 4/2003 | Chebil |
| 2003/0156637 A1 | 8/2003 | Van Der Schaar |
| 2003/0163209 A1 | 8/2003 | Fukuhara et al. |
| 2003/0179938 A1 | 9/2003 | Van der Vleuten |
| 2005/0025371 A1 | 2/2005 | Atsumi et al. |
| 2005/0169548 A1 | 8/2005 | Ducksburg et al. |
| 2006/0115166 A1 | 6/2006 | Sung et al. |
| 2006/0133517 A1 | 6/2006 | Ko |
| 2006/0171596 A1 | 8/2006 | Sung et al. |
| 2006/0215733 A1 | 9/2006 | Pun |
| 2007/0217704 A1 | 9/2007 | Zeng et al. |
| 2010/0305449 A1 | 12/2010 | Wegener et al. |
| 2011/0095920 A1 | 4/2011 | Mittal et al. |
| 2013/0159629 A1 | 6/2013 | Sadri et al. |
| 2014/0056577 A1 | 2/2014 | Ogawa et al. |
| 2014/0143517 A1 | 5/2014 | Jin et al. |
| 2014/0212058 A1 | 7/2014 | Yokose |

LOSSY DATA COMPRESSION

CROSS-REFERENCE TO RELATED APPLICATIONS AND CLAIM OF PRIORITY

This application is a continuation under 35 U.S.C. 120 of copending application Ser. No. 16/872,527 filed May 12, 2020, which is a continuation of prior application Ser. No. 15/383,853 filed Dec. 19, 2016, now U.S. Pat. No. 10,691,360, which claims foreign priority under 35 U.S.C. 119 from United Kingdom Application No. 1522449.6 filed Dec. 18, 2015.

BACKGROUND

Data compression, both lossless and lossy, is desirable in many applications in which data is to be stored in, and/or read from, a memory. By compressing data before storage of the data in a memory, the amount of data transferred to the memory may be reduced. An example of data for which data compression is particularly useful is image data, such as depth data to be stored in a depth buffer, pixel data to be stored in a frame buffer and texture data to be stored in a texture buffer. These buffers may be any suitable type of memory, such as cache memory, separate memory subsystems, memory areas in a shared memory system or some combination thereof.

A Graphics Processing Unit (GPU) may be used to process image data in order to determine pixel values of an image to be stored in a framebuffer for output to a display. GPUs usually have highly parallelised structures for processing large blocks of data in parallel. There is significant commercial pressure to make GPUs (especially those intended to be implemented on mobile devices) operate at lower power levels. Competing against this is the desire to use higher quality rendering algorithms on faster GPUs, which thereby puts pressure on a relatively limited resource: memory bandwidth. However, increasing the bandwidth of the memory subsystem might not be an attractive solution because moving data to and from, and even within, the GPU consumes a significant portion of the power budget of the GPU. The same issues may be relevant for central processing units (CPUs) as well as GPUs.

The embodiments described below are provided by way of example only and are not limiting of implementations which solve any or all of the disadvantages of known data compression techniques and hardware.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A lossy method of compressing data, such as image data, which uses wrap-around wavelet compression is described. Each data value is divided into two parts and the first parts, which comprise the most significant bits from the data values, are compressed using wrap-around wavelet compression. Depending upon the target compression ratio and the compression ratio achieved by compressing just the first parts, none, one or more bits from the second parts, or from a data value derived from the second parts, may be appended to the compressed first parts. The method described may be lossy or may be lossless. A corresponding decompression method is also described.

A first aspect provides a method, implemented in hardware logic, of compressing a block of data, the method comprising: (i) receiving a block of input data comprising a plurality of data values, wherein each of the data values comprises n bits; (ii) dividing each of the data values into two non-overlapping parts, a first part comprising n−k most significant bits and a second part comprising k least significant bits of the data value; (iii) applying wrap-around wavelet compression to the first parts of the data values to generate a plurality of compressed first parts; and (iv) selectively appending none, one or more bits from the second parts or from data values derived from the second parts to the compressed first parts to create a plurality of compressed data values; and (v) outputting a compressed block of data comprising the plurality of compressed data values.

A second aspect provides a method of decompressing a block of data, the method comprising: receiving a compressed data block comprising a plurality of compressed data values, wherein each of the data values comprises m+j bits, where j≥0; dividing each of the data values into a first compressed part comprising m most significant bits and, where j>0, also a second compressed part comprising j least significant bits of the data value; applying wrap-around wavelet decompression to the compressed first parts of the data values to generate a plurality of decompressed first parts; and appending k bits to the decompressed first parts to create a plurality of decompressed data values; and outputting a decompressed block of data comprising the plurality of decompressed data values.

A third aspect provides a compression unit comprising: an input arranged to receive a block of input data comprising a plurality of data values, wherein each of the data values comprises n bits; first hardware logic arranged to divide each of the data values into two non-overlapping parts, a first part comprising n−k most significant bits and a second part comprising k least significant bits of the data value; compression hardware logic configured to apply wrap-around wavelet compression to the first parts of the data values to generate a plurality of compressed first parts; second hardware logic arranged to selectively append none, one or more bits from the second parts or from data values derived from the second parts to the compressed first parts to create a plurality of compressed data values; and an output arranged to output a compressed block of data comprising the plurality of compressed data values.

A fourth aspect provides a decompression unit comprising: an input arranged to receive a compressed data block comprising a plurality of compressed data values, wherein each of the data values comprises m+j bits, where j≥0; fourth hardware logic arranged to divide each of the data values into a first compressed part comprising m most significant bits and, where j>0, also a second compressed part comprising j least significant bits of the data value; decompression hardware logic configured to apply wrap-around wavelet decompression to the compressed first parts of the data values to generate a plurality of decompressed first parts; and fifth hardware logic arranged to append k bits to the decompressed first parts to create a plurality of decompressed data values; and an output arranged to output a decompressed block of data comprising the plurality of decompressed data values.

Further aspects provide a GPU comprising a compression unit as described herein and/or a decompression unit as described herein (where the GPU may be embodied in hardware on an integrated circuit), computer readable code adapted to perform the steps of the method described herein when the code is run on a computer (where the computer readable code may be encoded on a computer readable storage medium, a method of manufacturing, at an integrated circuit manufacturing system, a GPU comprising a compression unit as described herein and/or a decompression unit as described herein, an integrated circuit definition dataset that, when processed in an integrated circuit manufacturing system, configures the system to manufacture a GPU comprising a compression unit as described herein and/or a decompression unit as described herein, and a computer readable storage medium having stored thereon an integrated circuit definition dataset that, when processed in an integrated circuit manufacturing system, configures the system to manufacture a GPU comprising a compression unit as described herein and/or a decompression unit as described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
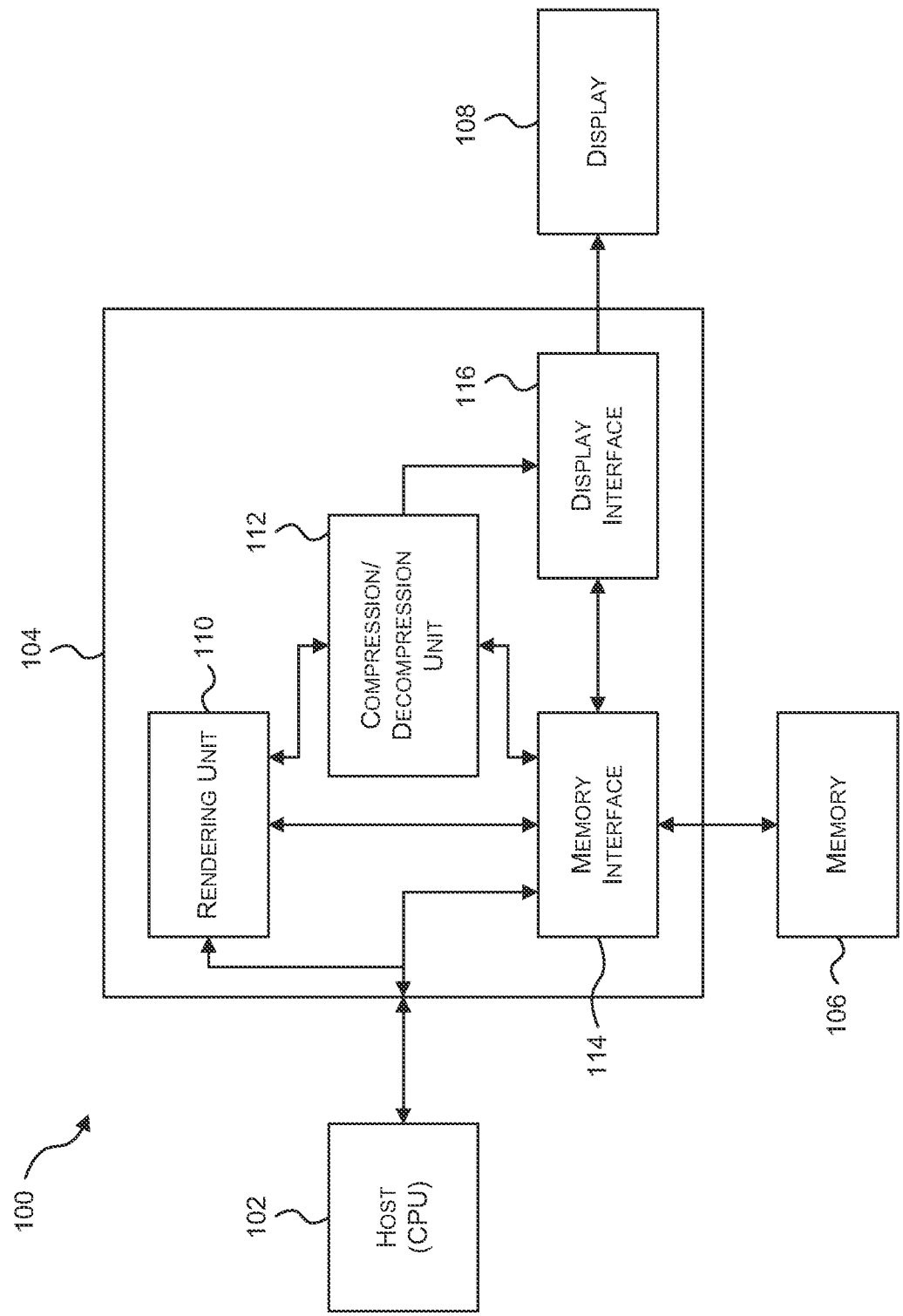
FIG. 1 shows a schematic diagram of an example graphics rendering system.

Common reference numerals are used throughout the figures to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Data compression is useful in a variety of different scenarios. Most of the examples described herein relate to the compression (and decompression) of image data for use by a GPU, but similar principles could be applied to the compression (and decompression) of other types of data such as audio, numeric or text data and/or for use by a processing unit other than a GPU, such as a CPU. Consequently, although the methods are described as being performed by a compression/decompression unit within a GPU, the method may be performed by a compression/decompression unit (or a unit which performs only compression or only decompression) in a device (e.g. a processor) which is not a GPU.

Framebuffer compression, for example, is used to reduce the storage requirements and bandwidth usage (e.g. to/from memory, whether on-chip or off-chip) for images. Typically, framebuffer compression uses lossless compression algorithms, such as the compression method described in GB2451911 which discloses a graphics rendering system which can compress a two-dimensional data set. However, as image resolution increases (e.g. for 8k video display) lossless compression may not be able to meet the requirements for saving bandwidth and/or reducing storage requirements.

FIG. 1 shows a schematic diagram of an example graphics rendering system 100 which may be implemented in an electronic device, such as a mobile device. The graphics rendering system 100 comprises a host CPU 102, a GPU 104, a memory 106 (e.g. a graphics memory) and a display 108. The CPU 102 is arranged to communicate with the GPU 104. Data, which may be compressed data, can be transferred, in either direction, between the GPU 104 and the memory 106. Images which are rendered by the GPU 104 may be displayed on the display 108.

The GPU 104 comprises a rendering unit 110, a compression/decompression unit 112, a memory interface 114 and a display interface 116. The system 100 is arranged such that data can pass, in either direction, between: (i) the CPU 102 and the rendering unit 110; (ii) the CPU 102 and the memory interface 114; (iii) the rendering unit 110 and the memory interface 114; (iv) the memory interface 114 and the memory 106; (v) the rendering unit 110 and the compression/decompression unit 112; (vi) the compression/decompression unit 112 and the memory interface 114; and (vii) the memory interface 114 and the display interface 116. The system 100 is further arranged such that data can pass from the compression/decompression unit 112 to the display interface 116, and such that data can pass from the display interface 116 to the display 108.

In operation, the GPU 104 processes regions of image data individually. The regions may for example represent rectangular (including square) portions of the image. The rendering unit 110 may perform scan conversion of graphics primitives, such as triangles and lines, using known techniques such as Z-tests and texture mapping. The rendering unit 110 may contain cache units to reduce memory traffic. Some data is read or written by the rendering unit 110, to the memory 106 via the memory interface unit 114 (which may include a cache) but for other data, such as data to be stored in a framebuffer, the data preferably goes from the rendering unit 110 to the memory interface 114 via the compression/decompression unit 112. The compression/decompression unit 112 reduces the amount of data that is to be transferred across the external memory bus to the memory 106 by compressing the data, as described in more detail below. The compression/decompression unit 112 may also be used to reduce the amount of data that is transferred to internal memory (i.e. memory within the GPU 104).

The display interface 116 sends completed image data to the display 108. An uncompressed image may be accessed directly from the memory interface unit 114. Compressed data may be accessed via the compression/decompression unit 112 and sent as uncompressed data to the display 108. In alternative examples the compressed data could be sent directly to the display 108 and the display 108 could include logic for decompressing the compressed data in an equivalent manner to the decompression of the compression/decompression unit 112. Although shown as a single entity, the compression/decompression unit 112 may contain multiple parallel compression and/or decompression units for enhanced performance reasons.

When compressing image data (e.g. in the compression/decompression unit 112), the image data is typically divided into independent, non-overlapping rectangular blocks in order to permit random access to the compressed data. These blocks may, for example, be 8×8, 16×16 or 32×32 pixels or may be non-square (e.g. 16×4, 32×2 or 32×16 pixels). The particular block size which is used is dependent upon the particular implementation. The block size may be selected independently of the size of the regions processed by the GPU, however there may be some benefit from selecting a block size such that it is a convenient multiple of the region size, or vice versa.

A compression scheme or algorithm is then used (e.g. in the compression/decompression unit 112) to reduce the number of bits used to represent the image data within each block by removing some of the correlation between nearby pixels and this technique may also be referred to as spatial decorrelation or prediction. Examples of two lossless compression schemes are wrap-around wavelet based compression and non-wrap-around wavelet based compression. These techniques compute the coefficients of a wavelet and use these in place of the uncompressed data values. Typically in wavelet compression, the set of input data values (where the data values may, for example, represent a pixel's colour in binary) are divided into two sets with the sets comprising alternate data values (e.g. one set corresponding to even positions of the pixels and the other set corresponding to odd positions of the pixels) and then neighbouring data values in the first set are used to estimate a likely value for the intervening value, which is in the second set (e.g. by taking the average of the two neighbouring values from the same set) and then the difference between the predicted value and the actual value of the intervening value (from the second set) is stored in place of the intervening value. These difference values for each data value from the second set can be stored in a smaller number of bits than the actual values from the second set, resulting in data compression. For example, given a set of data values A0-A5, they are divided into two sets, a first set (which may be referred to as the even set) comprising values A0, A2, A4 and a second set (which may be referred to as the odd set) comprising values A1, A3, A5. In this example, values from the first set are used to predict values from the second set (e.g. A0 and A2 are used to predict the value of A1) and then the differences between the predicted values and the actual values in the second set are stored instead of the values in the second set.

The difference between wrap-around wavelet based compression and non-wrap-around wavelet based compression is that for wrap-around wavelet based compression the computed values, throughout the whole wavelet transformation, are stored using n-bit arithmetic which is mathematically equivalent to performing all operations modulo $2^n$. In many examples n=8, such that all operations are performed modulo 256 and computation results outside the [0,255] range are mapped back into [0,255], e.g. $-1 \equiv 255$. This mapping may be achieved by only keeping the least significant n (e.g. 8) bits of any computed result.

To compute the original data from the computed wavelet coefficients (e.g. in the compression/decompression unit 112), the inverse wavelet transformation is simply the reverse of all involved steps. Data is recovered by restoring the elements from the second set from the stored differences and the predicted values calculated using the neighbouring elements from the first set.

Although not described herein, the compression/decompression unit 112 may perform additional operations either to put the data in the correct format (e.g. by performing format conversion) or to further compress/decompress the data (e.g. by performing colour decorrelation and/or entropy encoding).

Use of wrap-around wavelet based compression typically increases the achievable lossless compression ratio by around 15% compared to non-wrap-around wavelet based compression. However, as described above, for some applications (e.g. 8k resolution video display) lossless compression may not be able to meet compression ratio requirements and so it may be necessary to use lossy compression techniques. With lossy compression, each block must typically be compressed with a fixed ratio as requested by a bandwidth restriction (e.g. 25%, 50% or 75% compression).

Non-wrap-around wavelet based compression can be easily extended to support lossy compression by throwing away some high frequency information. However, with wrap-around wavelet based compression, even throwing away the lowest bit of an 8-bit coefficient could introduce a color difference as large as 255, as can be demonstrated with reference to the example shown in FIG. 2.

An example can be described with reference to FIG. 2 which uses the following example wavelet which uses the difference between the current pixel (e.g. pixel A2) and its left and right adjacent pixels as the wavelet coefficient:

$$\text{Wavelet: } A2'=A2-(A1+A3)/2$$

$$A3'=A3-A1$$

$$A1'=A1$$

$$\text{Inverse Wavelet: } A1=A1'$$

$$A3=A3'+A1'$$

$$A2=A2'+(A1+A3)/2$$

Figure 2:
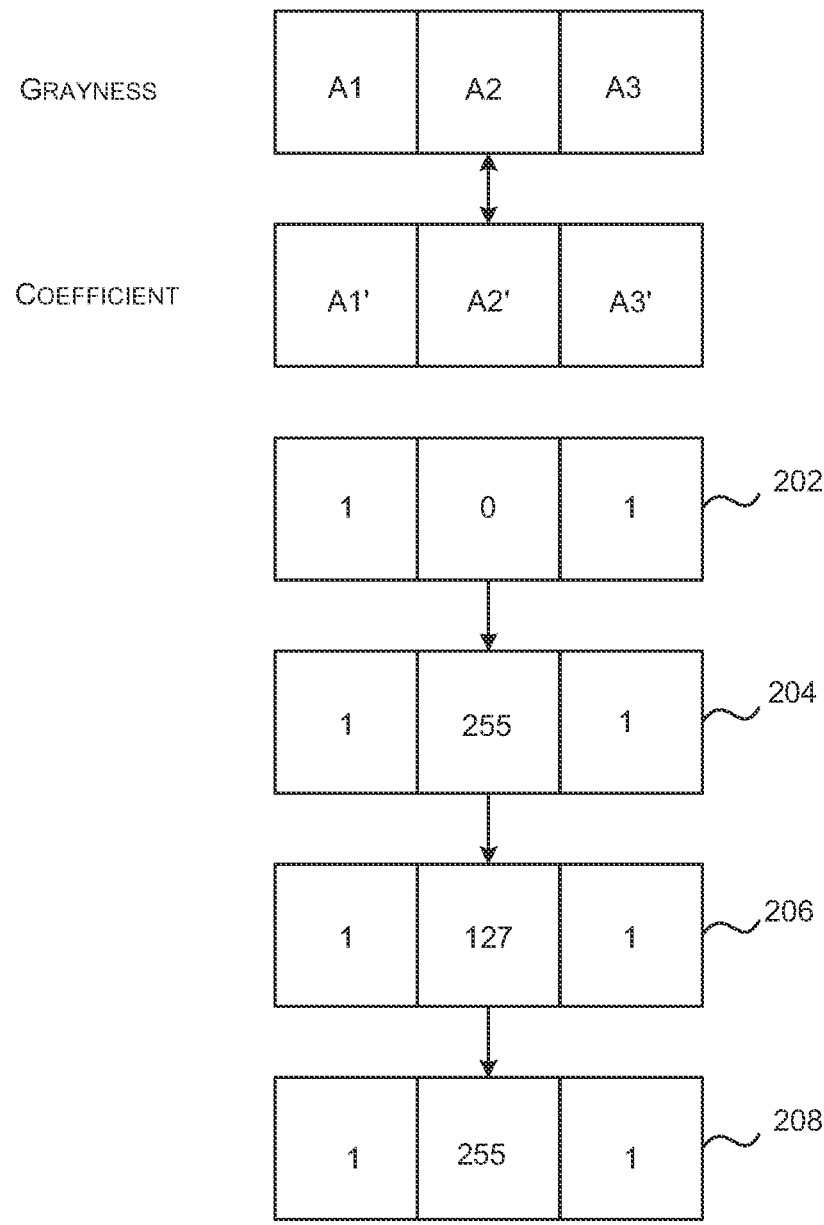
FIG. 2 is a schematic diagram demonstrating wrap-around wavelet compression and decompression.

If A1, A2 and A3 have the values as shown in example 202 in FIG. 2, i.e. A1=1, A2=0, A3=1, this gives:

$$A2'=0-(1+1)/2=-1$$

which with a wrap-around method (for n=8) will give:

A2'=255 or in binary 11111111 (as shown in example 204)

If compression is achieved by throwing away the least significant bit of the wavelet coefficient (i.e. the last 1 in A2'), the coefficient 255 in example 204 will be changed to 127 (or 1111111 in binary) as in example 206 and this coefficient may be denoted LA2'.

To decompress the data, the inverse wavelet (from above) is applied to the coefficients in example 206, which, using LA2' gives a decompressed value for A2 as:

LA2'=127 or 1111111 in binary

A2'=11111110 or 254 in decimals

A2=254+(1+1)/2=255 or 11111111 in binary (as shown in example 208)

This shows that by throwing away the lowest bit, a pure black color (0) could be changed to a pure white color (255) and introduce significant color difference between the original image and the compressed and decompressed image. Consequently, simply reducing the precision of the wavelet coefficients to achieve lossy compression does not work for wrap-around wavelet compression.

Whilst it might appear that a solution to the problem would be to use lossy non-wrap-around wavelet compression, instead of attempting to develop a lossy wrap-around wavelet compression technique which does not suffer the errors described above with reference to FIG. 2, as described above, using wrap-around wavelet compression, compared to non-wrap-around wavelet compression, can increase the lossless compression ratio (e.g. by 15%) and so there is a significant penalty associated with moving from wrap-around wavelet compression to non-wrap-around wavelet compression.

Described herein is a method of lossy data compression which uses wrap-around wavelet compression. The method allows image quality to be progressively improved during compression until a lossless result is obtained which means that the method can be used to provide a fixed compression ratio without introducing computation complexity. The method is fast and effective and can easily be implemented in hardware. The method may be implemented in hardware in a processor (such as a GPU) anywhere that pixels are written out, for example, to main memory (which may be off-chip memory), to a render target, etc. The method may, for example, be used to compress data for storage in a framebuffer.

As described in more detail below, the method involves receiving an input data set comprising a plurality of data values and dividing each data value into two parts—one containing one or more of the most significant bits (MSBs) and the other containing the remaining bits (with the order of the bits being maintained). A lossless compression algorithm is then applied to the first parts of each data value in the data set and then depending upon the amount of compression achieved using the lossless compression algorithm and the target compression ratio, none, one or more bits from the second parts of each data value, or from a value derived from the second parts of each data value, are appended to the compressed first parts. Also described herein is the corresponding method of decompressing data compressed using the lossy data compression method.

Figure 3:
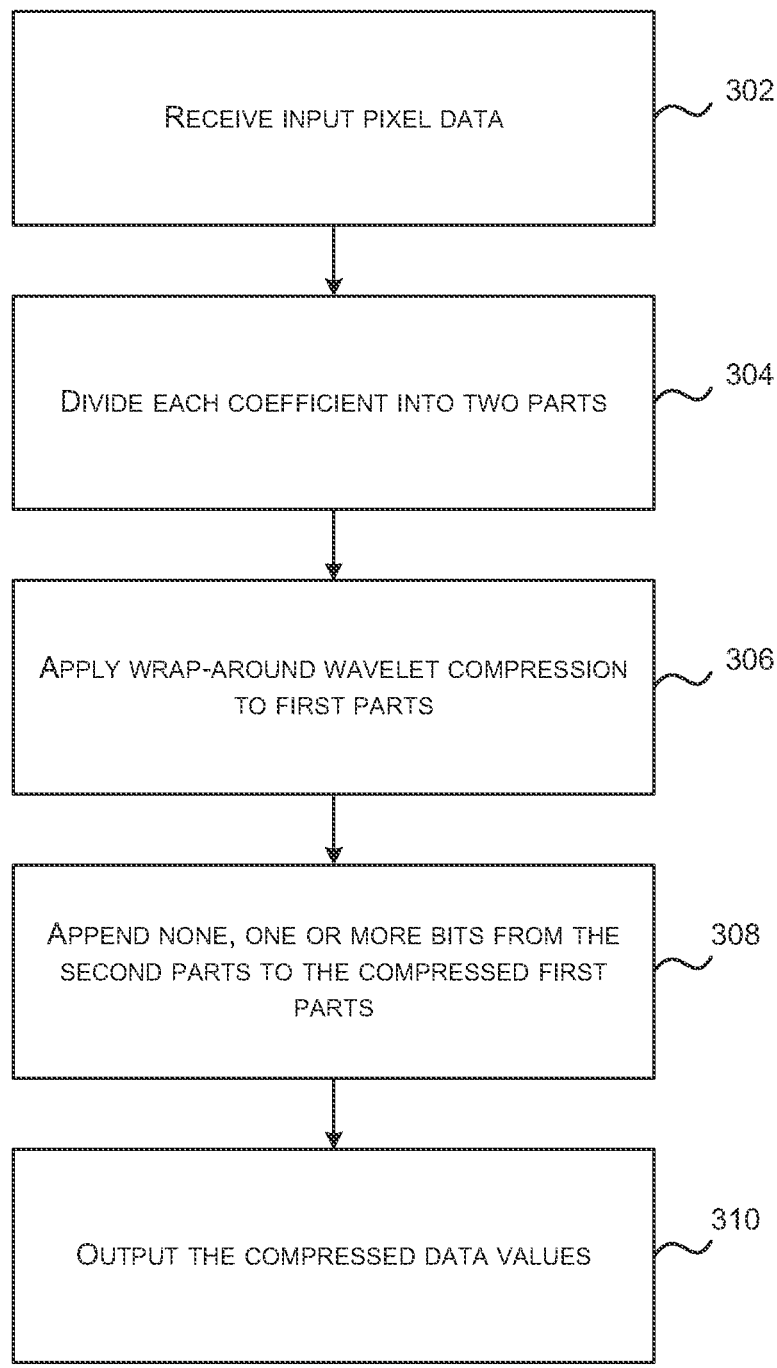
FIG. 3 is a flow diagram of an example method of lossy data compression which uses wrap-around wavelet compression.

FIG. 3 is a flow diagram of an example method of lossy data compression which uses wrap-around wavelet compression. This method may be implemented within the compression/decompression unit 112 or the compression hardware may be included in other elements within a GPU 104 (or other processor) where pixels are written out (e.g. to a buffer or other memory or to another element across a bandwidth constrained link). The method may be applied to rectangular blocks of pixel data (e.g. 8×8, 16×16 or 32×32 pixels, as described above) and so the method may form part of a compression system which is implemented.

Figure 4:
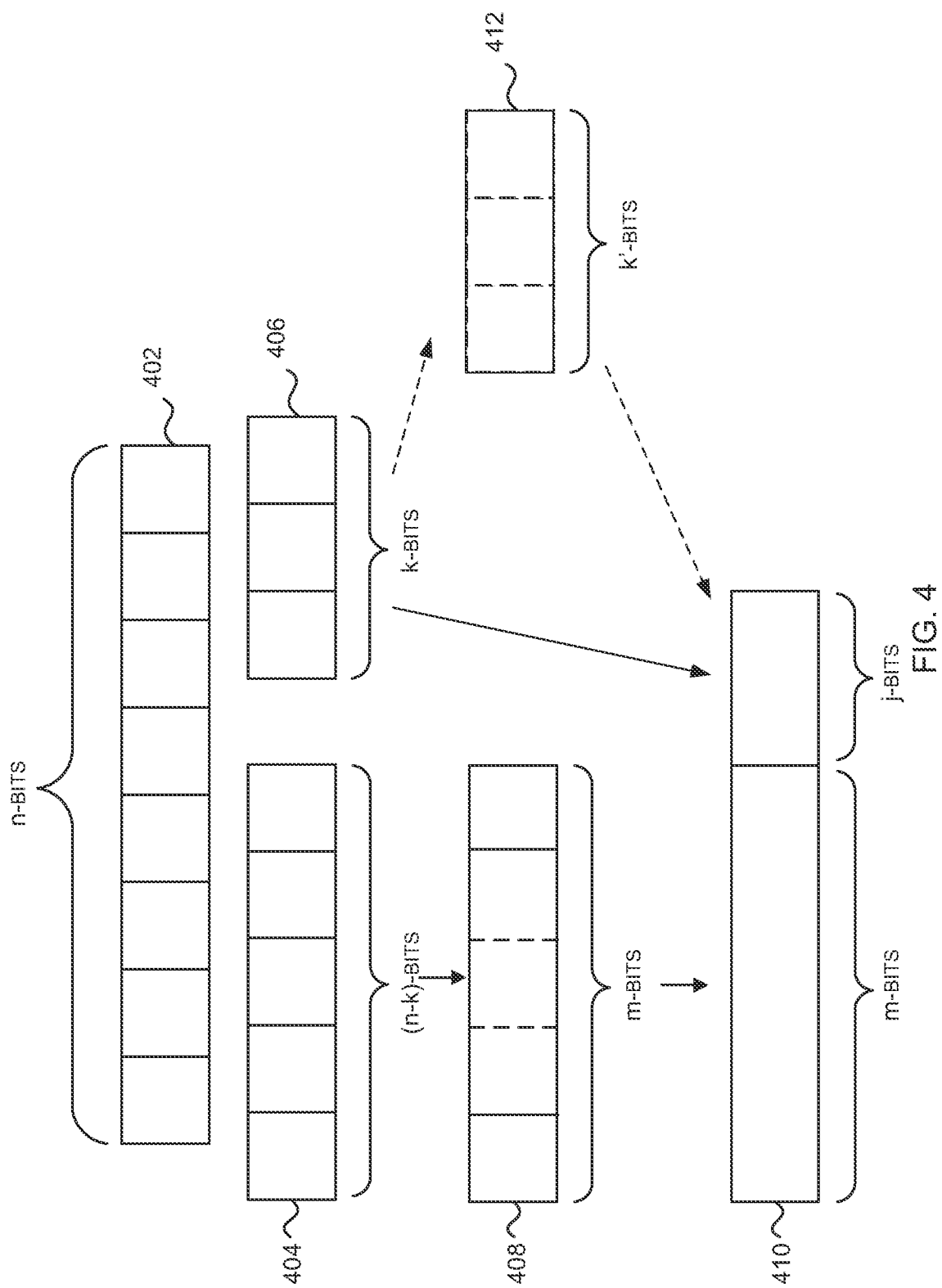
FIG. 4 is a schematic diagram illustrating the methods shown in FIGS. 3, 6 and 7.

As shown in FIG. 3, the method comprises receiving input pixel data for a block of pixels (block 302). This input data may, for example, comprise the colour of each pixel in binary. Each data value 402, which may also be referred to as a 'coefficient', (e.g. each colour value) is divided (block 304) into two parts 404, 406, as shown graphically in FIG. 4. The first part (or portion) 404 comprises the (n−k) most significant bits (MSBs) of the data value 402 and the second part (or portion) 406 comprises the k least significant bits (LSBs) of the data value 402, where n is the number of bits in the data value 402 (i.e. n>0) and k is a number which is non-zero and less than n (i.e. 0<k<n). The two parts 404, 406 are therefore non-overlapping and every bit in the input data value 402 is included in one (and only one) of the two parts 404, 406.

Having divided each input data value 402 into two parts (in block 304), wrap-around wavelet compression is applied to the first parts 404 of the input data (block 306) to generate compressed first parts 408 (which may comprise m bits, where m≤(n−k)) and any suitable wavelet transformation may be used. One example wavelet has been described above and in another example (as described in GB2451911) the neighbouring values (from the first set of values) may be used to estimate a likely value for the intervening value (from the second set) by taking an average of the two neighbouring values from the first set, where the average of two values $v_1$ and $v_2$ is given by:

$$\left(\frac{v_1 + v_2}{2}\right) \bmod n \text{ when } |v_1 - v_2| < n/2; \text{ and}$$

$$\left(\frac{v_1 + v_2}{2} + n/2\right) \bmod n \text{ when } |v_1 - v_2| \geq n/2$$

In this example, for the last pixel in a row/column there is only one available neighbour (the previous one) and so that value is used as the prediction (and from which the difference is then calculated and written back to the last pixel's storage location).

In other examples, different wavelet transformations (which may also be referred to as 'prediction schemes') may be used, such as the Linear and Haar prediction schemes given by:

$$P'_{2i+1} = P_{2i+1} L\text{Predict}(P_{2i}, P_{2i+2}) \bmod 2^n \quad \text{(Linear)}$$

$$P'_{2i+1} = P_{2i+1} - P_{2i} \bmod 2n \quad \text{(Haar)}$$

where i is the bit index within a data value such that $P_{2i+1}$ are the original coefficients (from the second set) and $P'_{2i+1}$ are the replacement values (i.e. the differences) and where LPredict is given by:

$$L\text{Predict}(A, B) = \begin{cases} \left(\left\lfloor\frac{A+B}{2}\right\rfloor + 2^{n-1}\right) \bmod 2^n, & \text{if } |A - B| \geq 2^{n-1} \\ \left\lfloor\frac{A+B}{2}\right\rfloor \bmod 2^n, & \text{otherwise} \end{cases}$$

Having applied wrap-around wavelet compression to the first parts 404 of the input data (in block 306) to generate compressed first parts 408 (i.e. one compressed first part 408 for each input data value 402), none, one or more bits (e.g. j-bits, where 0≤j≤k) from the corresponding second part 406 are then appended to the compressed first part 408 (block 308) to generate a compressed data value 410. The number of bits, j, which are appended (in block 308) may be determined based on a predefined target compression ratio and/or based on other factors and where j=k the method shown in FIG. 3 is lossless. The compressed data values 410 are then output (block 310), e.g. to a memory or buffer for storage or to another element across a bandwidth constrained link.

In performing the method shown in FIG. 3, each of the input data values 402 are treated in the same way, i.e. the value of k is the same for all data values in the input data set and the value of j is the same for all data values in the input data set. Following the splitting of an input data value 402 (in block 304), the first part 404 (comprising n–k bits) is compressed using a lossless compression technique, such as a wrap-around wavelet based compression method (in block 306) and then none, one or more bits (j bits) from the second part 406 of the same original input data value 406 are appended to the compressed first part 408 (in block 308). The first and second parts 404, 406 which are formed by dividing a single input data value 402 (in block 304) may be referred to as being corresponding parts of a data value.

Figure 5:
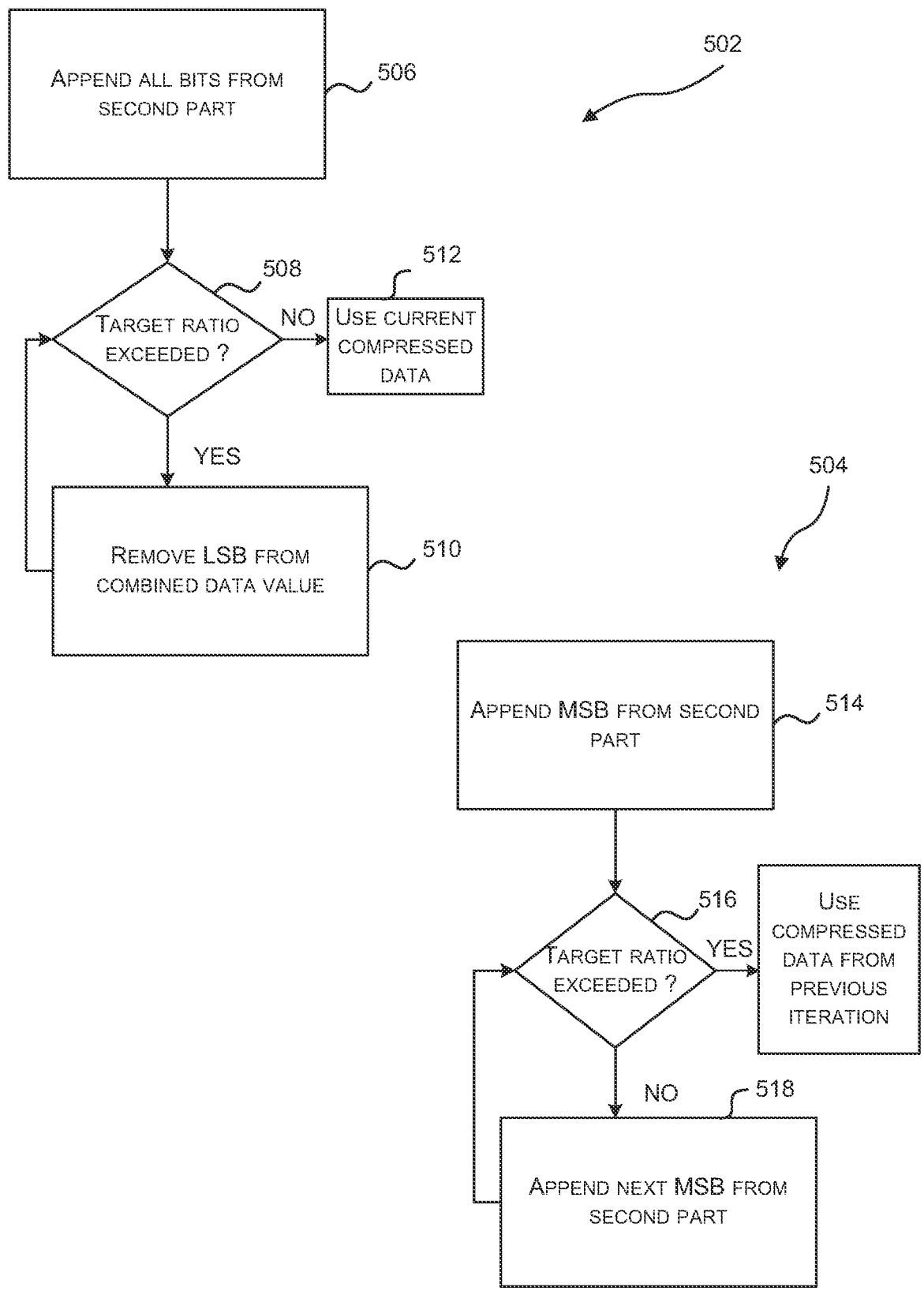
FIG. 5 shows flow diagrams of two different example methods of determining how many bits from the second parts are appended to each of the compressed first parts.

FIG. 5 shows two different methods 502, 504 of determining how many bits from the second parts are appended to each of the compressed first parts (in block 308) i.e. FIG. 5 shows two different methods of determining the value j, where the maximum value of j is equal to k (and this provides lossless compression). Both methods use a target compression ratio for the resultant compressed data, where this ratio may be defined in any way and in one example is defined as the uncompressed size divided by the compressed size. Both of the methods 502, 504 shown in FIG. 5 guarantee that the target compression ratio is met whilst minimizing the precision loss (which may impact image quality).

In the first example method 502 shown in FIG. 5, all the bits (i.e. all k bits) from the second part 406 are initially appended to the compressed first part 408 (block 506). The resultant compression ratio is determined and compared to the target compression ratio (block 508). If the target compression ratio is exceeded ('Yes' in block 508) then the least significant bit (LSB) is removed from the combination of the compressed first part 408 and the second part 406 (block 510), which effectively reduces the value of j by one (with j initially being set equal to k) and this is repeated until the target compression ratio is not exceeded ('No' in block 508). Once the target compression ratio has been found to be not exceeded ('No' in block 508), the current compressed data (i.e. the compressed first part 408 and any remaining part of the appended second part 408 after the removal of none, one or more bits in block 510) is output as the compressed data values (block 512).

The second example method 504 shown in FIG. 5 achieves the same end result but approaches it from the opposite perspective. In this method 504, MSBs from the second part 406 are added one by one until the target compression ratio is exceeded. As shown in FIG. 5, initially a single MSB from the second part 406 is appended (block 514) and the resultant compression ratio is determined and compared to the target compression ratio (block 516). If the target compression ratio is not exceeded ('No' in block 508) then a further bit from the second part (i.e. the second MSB from the second part 406) is appended (block 518). The resultant compression ratio is determined and again compared to the target compression ratio (in block 516) and the method repeats until the target ratio is exceeded ('Yes' in block 516). At this point, the compressed data value as created in the most recent iteration of block 518 cannot be used because the target compression ratio is not satisfied, so instead the compressed data value from the previous iteration is used (e.g. the LSB is removed from the compressed data value created in the most recent iteration to regenerate the compressed data value from the previous iteration). If the target ratio is not exceeded, even when all the bits from the second part have been appended (in block 518), i.e. where j=k, then the method stops and the output data values comprise the compressed first part with the entire second part appended and as mentioned above, this provides a lossless compression method.

It will be appreciated that in other examples, a combination of the two methods 502, 504 may be used or larger increments may be used in blocks 510 and 518 (e.g. more than one bit may be removed or appended in each iteration). In various examples, the number of bits which are removed/appended in each iteration (in block 510 or 518) may vary and may, for example, depend upon the difference between the current resultant compression ratio and the target compression ratio (e.g. so that for larger differences, more than one bit is removed/appended and for smaller differences only one bit is removed/appended). In various examples, the target compression ratio which is used in block 508 may be set below the actual target compression ratio for the system so that, for example, the test in block 508 may alternatively allow the resultant compression ratio to exceed the target compression ratio by a small amount. In various examples, the methods may not be implemented iteratively, but instead, multiple combinations (e.g. multiple values of j) may be tested in parallel (e.g. using duplicate hardware blocks) to determine the value which most closely satisfies the target compression ratio without exceeding that target.

Figure 6:
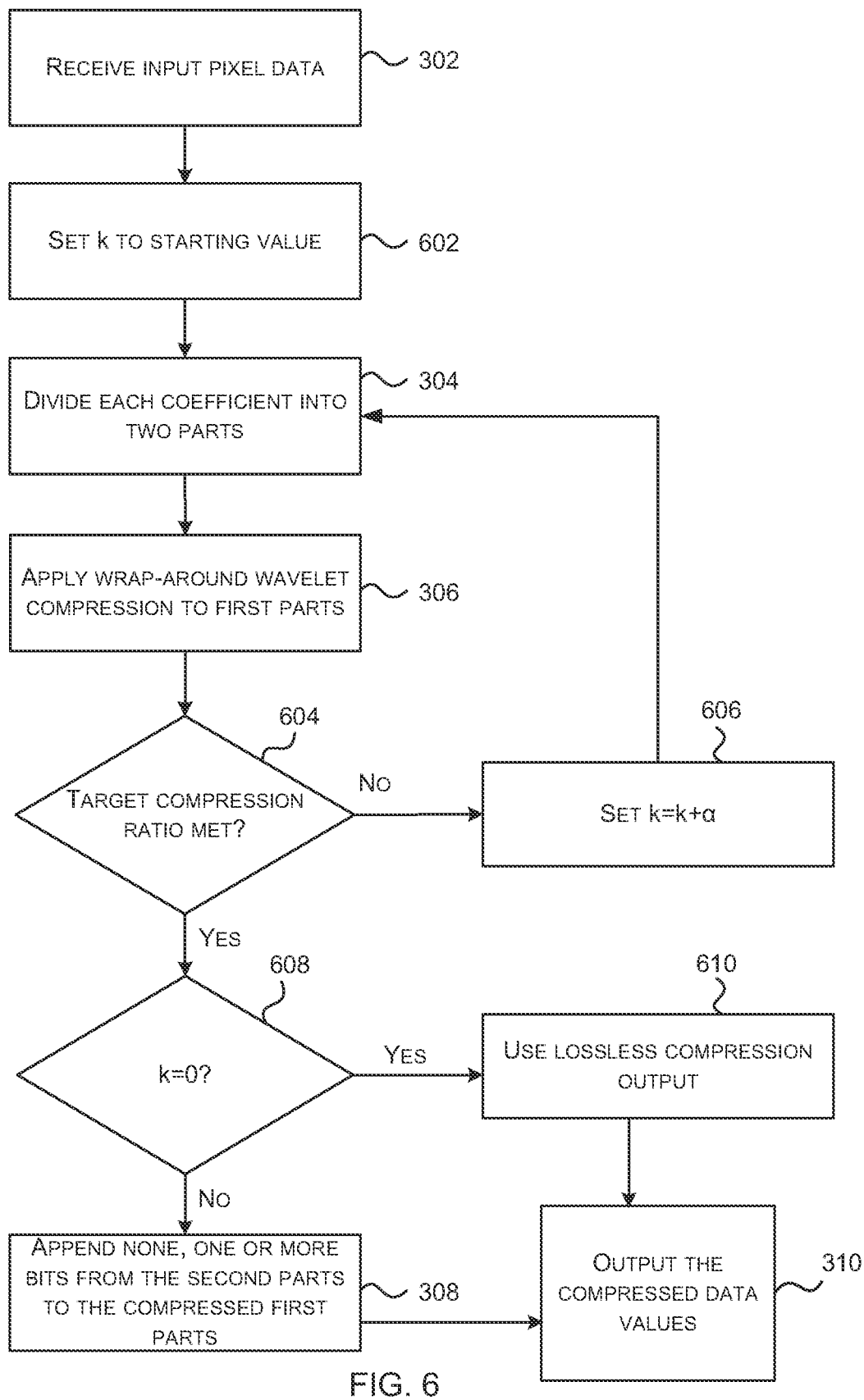
FIG. 6 is a flow diagram of another example method of lossy data compression which uses wrap-around wavelet compression.

In addition to (or instead of) varying the value of j in block 308 to meet a target compression ratio, e.g. as shown in FIG. 5, the value of k may be varied as can be described with reference to FIG. 6. As shown in FIG. 6, the value of k is set to an initial value (block 602) which may be zero. The method then proceeds as described above with reference to FIG. 3, by dividing each part into two coefficients based on the value of k (block 304) although where k=0, the second part 406 will not comprise any bits. The first part 404 of each data value is then compressed using wrap-around wavelet compression (block 306) before a resultant compression ratio is calculated based only on the compressed first parts 408 (i.e. at this point j=0). If the target compression ratio is not met with j=0 ('No' in block 604), then the value of k is incremented (block 606), i.e. the size of the second part is increased. In various examples, the value of k may be incremented by one (i.e. α=1) or in other examples, the value of k may be increased by more than one, e.g. α=2 or α=3. Where the difference in resulting compression ratio does not vary significantly for a small change in the value of k (e.g. for α=1) then by using a larger increment (e.g. α=2 or α=3) the method may terminate more quickly.

Having increased the value of k (in block 606), the new value of k is then used to form the two parts of the input data value (in block 304) before compressing the first part using wrap-around wavelet compression (in block 306). The resultant compression ratio is then re-calculated and compared to the target compression ratio (in block 604). Once a value of k has been found where the target compression ratio is satisfied ('Yes' in block 604) with j=0, none, one or more bits from the second part can then be appended whilst still satisfying the target compression ratio (block 308). This adding back of none, one or more bits (in block 308) may, for example, be performed as described above with reference to the examples in FIG. 5. The only exception to this is where k=0 because in that case, there is no second part (and hence j=0) and in this situation ('Yes' in block 608), the output from the initial lossless compression (in block 306) is used as the final output of compressed data.

Although FIG. 6 is described above with a positive value for α (so that the value of k increases with each iteration of the method), in other examples a negative value for α may be used, e.g. such that the value of k is decreased in each iteration, for example until the target compression ratio is reached.

Although FIG. 6 shows an iterative process (e.g. with increasing/decreasing values of k in each successive iteration), in other examples the method may be performed at least partially in parallel (e.g. blocks 602, 304, 306 and 604 may be performed in parallel for two or more different values of k) using duplicate hardware blocks.

Figure 7:
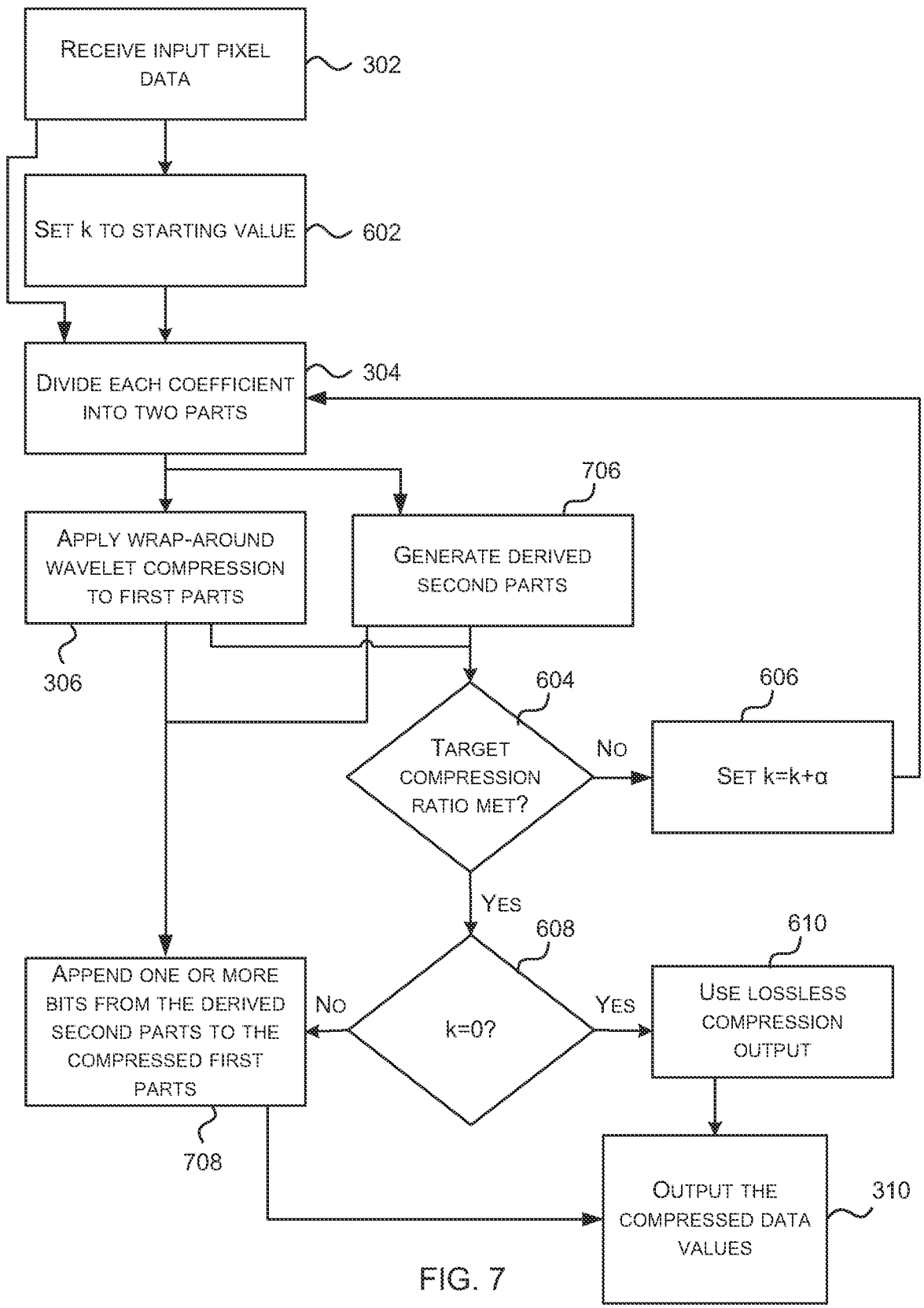
FIG. 7 is a flow diagram of a further example method of lossy data compression which uses wrap-around wavelet compression.

In examples where one or more bits are appended to the compressed first part 408, these j bits may be the MSBs from the second part 406 (e.g. as in block 308 of FIG. 3 or FIG. 6) or they may be the MSBs from a value 412 which is derived from the second part 406 (as shown in FIG. 7). This derived second part 412 comprises k'-bits where k'≤k (e.g. k'=k unless compression is used to derive the value 412, in which case k' may be less than k). In the method shown in FIG. 7, as well as compressing the first parts using wrap-around wavelet compression (in block 306), the second parts are also modified to generate derived second parts (in block 706) and then none, one or more bits from the derived second parts (generated in block 706) are then appended to the compressed first parts (block 708) in an operation which may be performed in an analogous way to block 308, for example by using the methods described above with reference to FIG. 5 but using the derived second parts 412 of the input data values instead of the second parts 406 themselves. FIG. 7 shows both the equivalent method to FIG. 3 (in which blocks 602-610 are omitted) and the equivalent method to FIG. 6.

In an example, the derived second parts 412 may be generated (in block 706) using a compression scheme (e.g. a non-wavelet based compression scheme) to compress the second parts 406. By compressing the second parts it may be possible to achieve k'<k and as a result there may be less degradation in image quality where j<k' (i.e. where not all the bits from the derived second parts are appended in block 708).

In another example, the derived second parts 412 may be generated (in block 706) as a function of both the second parts 406 and the first parts 404 of each input data value 402. For example, the derived second part 412 of a data value may be generated (in block 706) using an XOR function, i.e. by XORing the k MSBs of the first part 404 with the k bits in the second part 406. This can be described with reference to an example where k=3:

Input data value 402: ABCDEFGH
First part 404: ABCDE
Second part 406: FGH
Derived second part 412: ABC XOR FGH
Or for a specific example:
Input data value 402: 11011010
First part 404: 11011
Second part 406: 010
Derived second part 412: 110 XOR 010=100

It will be appreciated that the two ways of calculating the derived second parts 412 (in block 706) described above are just two examples of possible methods that may be used. Other methods (e.g. other reversible methods) may alternatively be used to generate a derived second part 412 from a second part 406 of an input data value 402. Different methods may, for example, be used dependent upon the value of k (e.g. as determined using the iterative method of FIG. 6) or the same method of generating a derived second part may be used for all values of k.

As described above, the compressed data values 410 generated using the methods of FIG. 3, 6 or 7 may be further compressed using additional techniques (e.g. entropy encoding) or the compressed data values 410 may be output to the memory, buffer or other target device.

The methods described above provide a lossy method of wrap-around wavelet compression which can be used to achieve a target compression ratio, although the methods may alternatively be used independently of any target compression (e.g. with a fixed k and fixed j).

As described above, the methods of FIG. 3, 6 or 7 may be implemented in hardware logic within a compression/decompression unit 112 in a GPU or wherever pixels are written out in the GPU or elsewhere. Parts of the hardware logic may be replicated to enable multiple iterations of the method to be implemented in parallel (e.g. for different values of k and/or j) and this replication of the hardware may increase the speed of performing the method, which may be important where the method is implemented at the time the data is written to memory (e.g. to determine the most appropriate way to compress the particular data to meet a target compression ratio). The hardware logic may also be replicated to provide separate hardware for implementing different target compression ratios (e.g. 25%, 50% and 75%).

When using lossy compression methods, space may be allocated in the target location for each block of input data which is sized according to a predefined compression ratio, e.g. a space may be allocated which is x % of the size of the input data block, where x is predefined (e.g. 25, 50 or 75%). Using some known lossy compression methods a header (or similar data structure) may be provided which identifies how much of the pre-allocated space is used to store the compressed data because, depending upon the actual data values being compressed, the size of the resultant compressed data may vary significantly (e.g. some image data may be much more easily compressed than others). This header ensures that an entity which reads the compressed data (which may be a decompression unit) reads the compressed data but does not unnecessarily read other, erroneous data which may be stored in the unused part of the pre-allocated space. Using the methods described herein to achieve a target compression ratio, the need for such a header may be removed, thereby saving the storage space used to store the header structure.

The corresponding decompression method, which is the inverse of the compression method described above, can be described with reference to FIG. 8. This method may be implemented within the compression/decompression unit 112 or the decompression hardware may be included in other elements within a GPU 104 (or other processor) where pixels are read in (e.g. from a buffer or other memory or from another element across a bandwidth constrained link). The method may be applied to rectangular blocks of pixel data (e.g. 8×8, 16×16 or 32×32 pixels, as described above).

Figure 8:
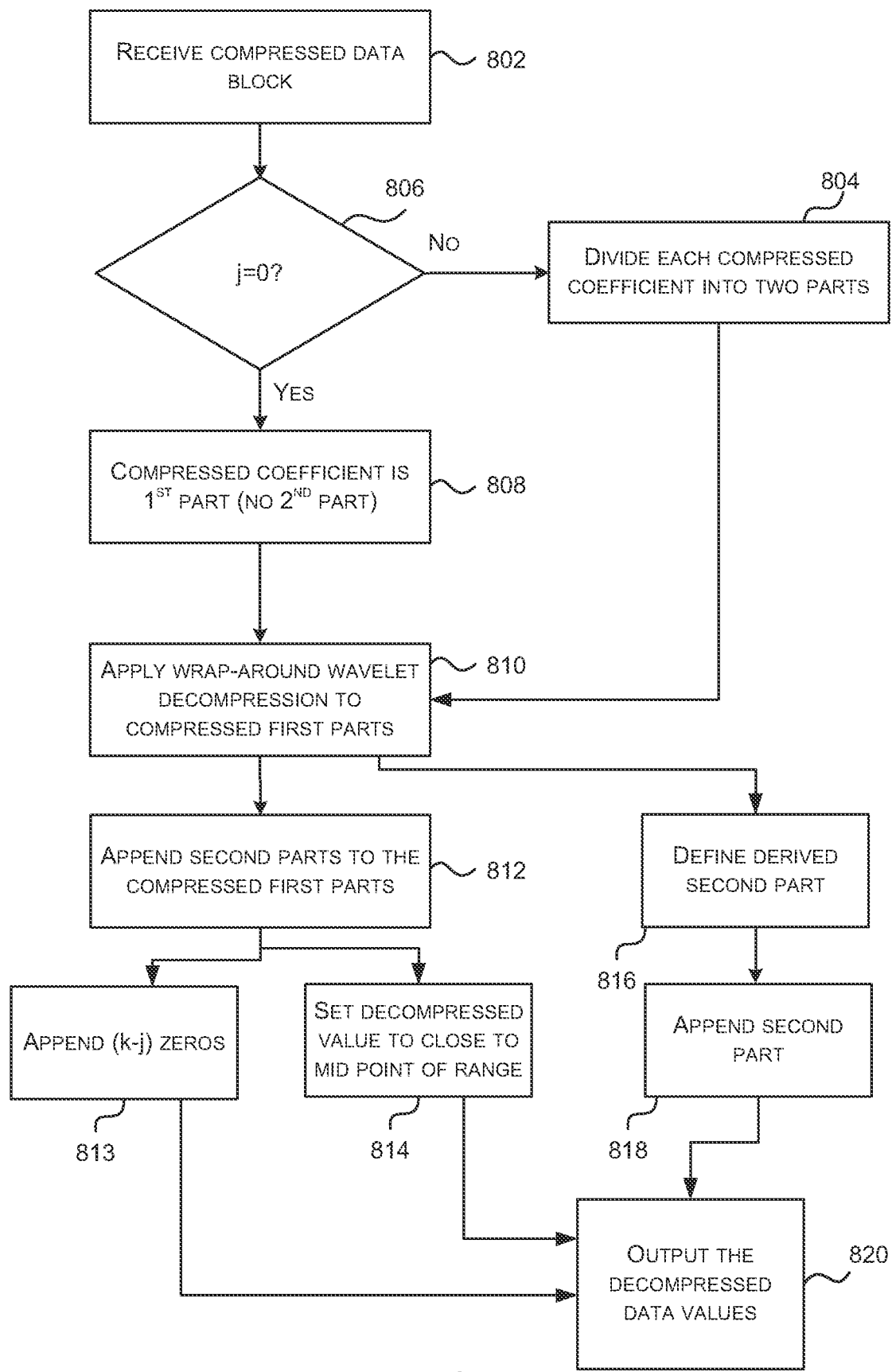
FIG. 8 is a flow diagram of an example method of lossy data decompression which uses wrap-around wavelet decompression.
Figure 9:
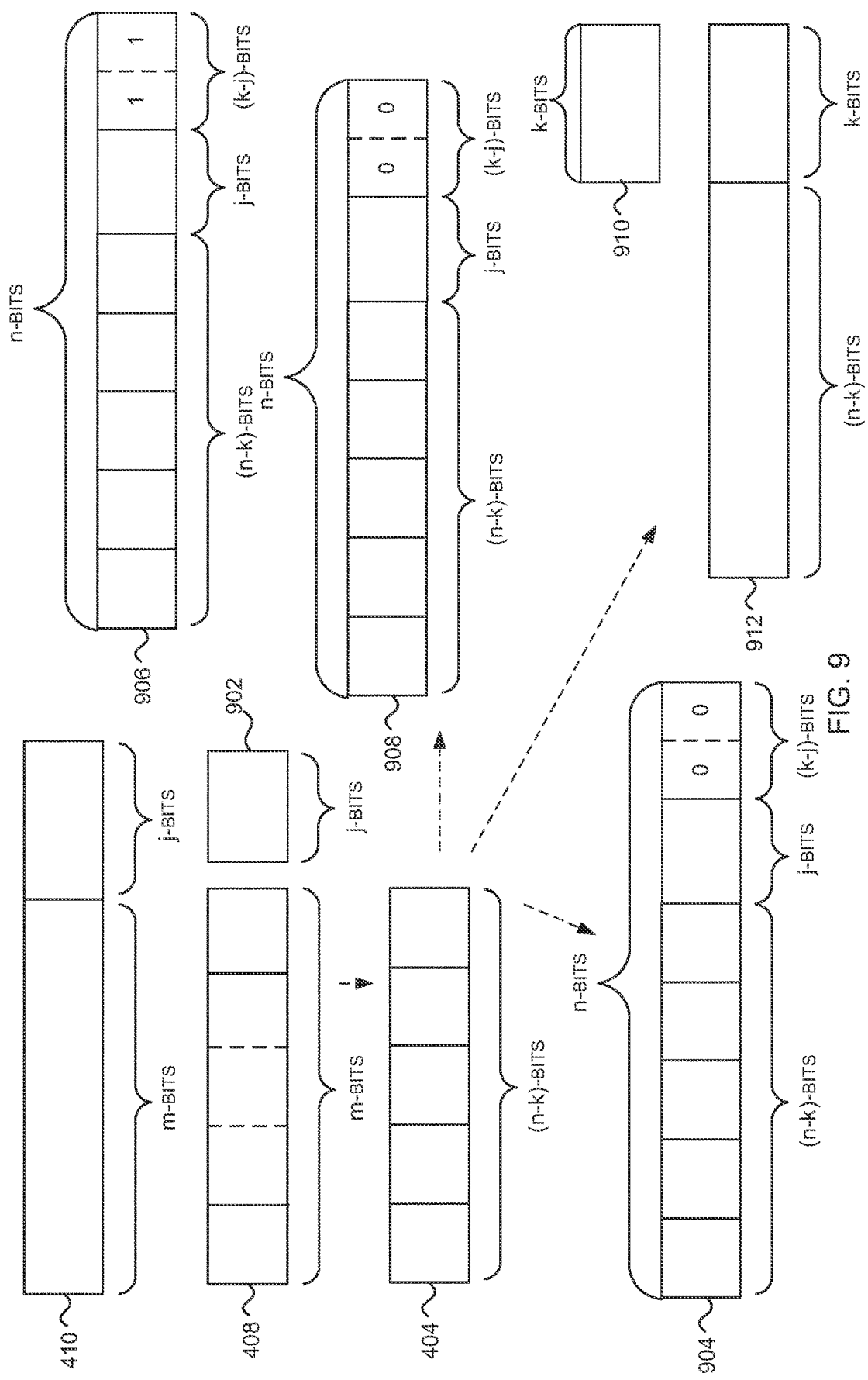
FIG. 9 is a schematic diagram illustrating the methods shown in FIG. 8.

As shown in FIG. 8, the method comprises receiving compressed data for a block of pixels (block 802). The compressed data comprises a plurality of compressed data values 410 which may alternatively be referred to as compressed coefficients. The decompression uses the same values of m, n, k and j bits as the corresponding compression method and starts by dividing each compressed data value 410 into two parts 408, 902 (block 804), as shown in FIG. 9. The first part 408, which may be referred to as the 'compressed first part' to match the earlier terminology, comprises the m MSBs from the compressed data value 410. The second part 902 comprises the remaining j bits of the compressed data value 410. In examples where j=0, there will be no second part 902 ('Yes' in block 806 and block 808).

The decompression method proceeds by applying wrap-around wavelet decompression to the compressed first parts 408 (block 810) to generate uncompressed first parts 404 (i.e. which correspond to the original first parts from the compression method and comprise (n−k) bits). This uses the inverse wavelets which correspond to the wavelets used in the compression process. For example, if the following wavelet is used in compression (in block 306):

Wavelet: $A2'=A2-(A1+A3)/2$ $A3'=A3-A1$ $A1=A1$

Then the following inverse wavelet is used in decompression (in block 810):

Inverse Wavelet: $A1=A1'$ $A3=A3'+A1'$ $A2=A2'+(A1+A3)/2$

Although any other wavelet transformation may be used for both compression (in block 306) and decompression (in block 810) and other examples are described above.

As shown in FIGS. 8 and 9, there are a number of different ways that the method can then proceed and three examples are shown in FIGS. 8 and 9 and described below. The first two examples assume that the compression was performed using the method of FIG. 3 or 6 (which appended none, one or more bits from the second part 406) and the third example assumes that the compression was performed using the method of FIG. 7 (which appended one or more bits from the derived second part 410).

In a first example, the j-bits of the second part 902 may be appended to the uncompressed first part 404 (block 812) and then (k−j) zeros may be appended to the combination (block 813) to generate a decompressed data value 904 comprising n bits ((n−k)+j+(k−j)=n). The decompressed data values are then output (block 820).

The first example can be described with reference to an example for k=3, j=0:
  Compressed data value 410: A'B'C'D'E'
  Compressed first part 408: A'B'C'D'E'
  Second part 902: (does not exist as j=0)
  Decompressed first part 404: ABCDE
  Decompressed data value 904: ABCDE000
Or if k=3, j=1:
  Compressed data value 410: A'B'C'D'E'F
  Compressed first part 408: A'B'C'D'E'
  Second part 902: F
  Decompressed first part 404: ABCDE
  Decompressed data value 904: ABCDEF00
Or if k=3, j=2:
  Compressed data value 410: A'B'C'D'E'FG
  Compressed first part 408: A'B'C'D'E'
  Second part 902: FG
  Decompressed first part 404: ABCDE
  Decompressed data value 904: ABCDEFG0
Or if k=3, j=3 (in which case the method is lossless):
  Compressed data value 410: A'B'C'D'E'FGH
  Compressed first part 408: A'B'C'D'E'
  Second part 902: FGH
  Decompressed first part 404: ABCDE
  Decompressed data value 904: ABCDEFGH In a second example, having appended the second part 902 to the decompressed first part 404 (in block 812) instead of appending (k−j) zeros, a range of possible values of the decompressed data value are determined based on the second data part and the decompressed data value is set to a middle value in the range (block 814). The upper limit of the range 906 is determined by appending (k−j) ones and the lower limit of the range 908 is determined by appending (k−j) zeros (and hence is the same as the decompressed data value 904 from the first example). The middle value is therefore obtained by setting the (k−j) LSBs in the decompressed data value to a middle value between (k−j) ones and (k−j) zeros. In many examples there may be two possible middle values (e.g. a one followed by (k−j−1) zeros, or a zero followed by (k−j−1) ones) and either one may be selected. The decompressed data values are then output (block 820).

The second example can be described with reference to an example for k=3, j=0:
  Compressed data value 410: A'B'C'D'E'
  Compressed first part 408: A'B'C'D'E'
  Second part 902: (does not exist as j=0)
  Decompressed first part 404: ABCDE
  Max value 906: ABCDE111
  Min value 908: ABCDE000
  Decompressed data value: ABCDE011 or ABCDE100
Or if k=3, j=1:
  Compressed data value 410: A'B'C'D'E'F
  Compressed first part 408: A'B'C'D'E'
  Second part 902: F
  Decompressed first part 404: ABCDE
  Max value 906: ABCDEF11
  Min value 908: ABCDEF00
  Decompressed data value: ABCDEF10 or ABCDEF01
Or if k=3, j=2:
  Compressed data value 410: A'B'C'D'E'FG
  Compressed first part 408: A'B'C'D'E'
  Second part 902: FG
  Decompressed first part 404: ABCDE
  Max value 906: ABCDEFG1
  Min value 908: ABCDEFG0
  Decompressed data value: ABCDEFG0 or ABCDEFG1
Or if k=3, j=3, the method is lossless and the example is the same as that described above with reference to the first example.

The third example corresponds to the compression methods described with reference to FIG. 7 in which a derived second part is generated (in block 706) and then one or more bits (j-bits) from that derived second part are appended to the compressed first part (in block 708). In this third example, the second part 902 of the compressed data value comprises one or more bits (j-bits) of the derived second part 410 and so the decompression method involves reconstructing a further (or un-derived) second part 910 (block 816) and appending it to the decompressed first part 404 (block 818) to generate a decompressed data value 912.

The reconstruction operation (in block 816) will depend upon the method used to generate the derived second part 410 (in block 706) in the compression operation. In an example, where a compression technique is used to generate the derived second part 410 (in block 706), the corresponding decompression technique may be used (in block 816) to generate the further (or un-derived) second part 910. If however, the derived second part 412 of a data value is generated (in block 706) using an XOR function, i.e. by XORing the k MSBs of the first part 404 with the k bits in the second part 406, an XOR function is also used to generate the further (or un-derived) second part (in block 816). In such an example, the j bits from the second part 902 of the compressed data value are XORed with the j MSBs of the decompressed first part and the next k−j MSBs from the decompressed part are appended to the result of the XORing operation. This can be described with reference to an example, for k=3, j=1:
Compressed data value 410: A'B'C'D'E'F
Compressed first part 408: A'B'C'D'E'
Second part 902: F
Decompressed first part 404: ABCDE
Further second part 910: F'BC where F'=F XOR A
Decompressed data value 912: ABCDE F'BC
Or if k=3, j=2:
Compressed data value 410: A'B'C'D'E'FG
Compressed first part 408: A'B'C'D'E'
Second part 902: FG
Decompressed first part 404: ABODE
Further second part 910: F'G'C where F'G'=FG XOR AB
Decompressed data value 912: ABODE F'G'C
Or if k=3, j=3 (in which case the method is lossless):
Compressed data value 410: A'B'C'D'E'FGH
Compressed first part 408: A'B'C'D'E'
Second part 902: FGH
Decompressed first part 404: ABODE
Further second part 910: F'G'H' where F'G'H'=FGH XOR ABC
Decompressed data value 912: ABODE F'G'H'

A fourth example may also be described which is a combination of the first and third examples described above and may be used where the methods shown in FIG. 3 or 6 were used for compression and where 0≤j<k. In this example, instead of appending (k−j) zeros (in block 813) one or more bits from the decompressed first part 404 may be appended, as can be described with reference to an example for k=3, j=0:
Compressed data value 410: A'B'C'D'E'
Compressed first part 408: A'B'C'D'E'
Second part 902: (does not exist as j=0)
Decompressed first part 404: ABCDE
Decompressed data value 904: ABCDEABC
i.e. where j=0, the k MSBs from the decompressed first part 404 are appended to the decompressed first part 404. The decompressed data values are then output (block 820).
If k=3, j=1 then the example becomes:
Compressed data value 410: A'B'C'D'E'F
Compressed first part 408: A'B'C'D'E'
Second part 902: F
Decompressed first part 404: ABCDE
Decompressed data value 904: ABCDEFBC
i.e. where 0<j<k, a further second part is generated by taking the k MSBs from the decompressed first part 404 and then replacing the j MSBs in the k MSBs by the second part 902. So if instead k=3, j=2:
Compressed data value 410: A'B'C'D'E'FG
Compressed first part 408: A'B'C'D'E'
Second part 902: FG
Decompressed first part 404: ABCDE
k MSBs from the first part: ABC
k MSBs with j MSBs replaced: FGC
Decompressed data value 904: ABCDEFGC
where the 3 MSBs ABC are taken from the decompressed first part and then the two MSBs AB are replaced by the second part FG and then these three bits, FGC, are appended to the decompressed first part.

The methods of compression and decompression described herein may be used anywhere that lossless compression and decompression methods are currently used and anywhere where lossless techniques cannot meet a target compression ratio.

Figure 10:
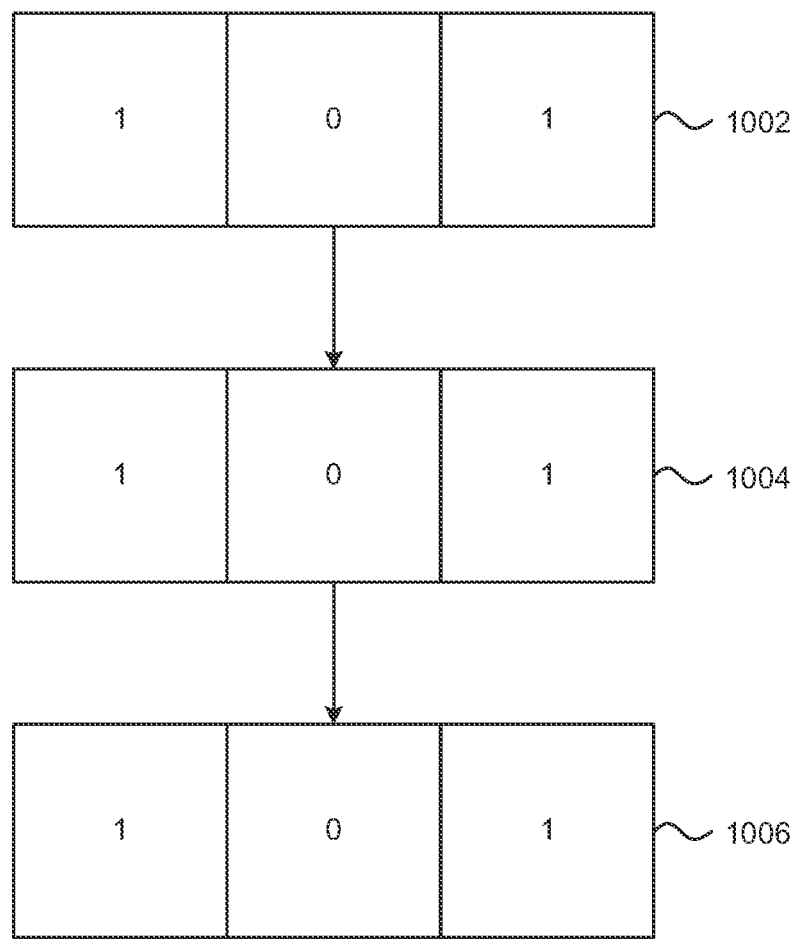
FIG. 10 is a schematic diagram demonstrating wrap-around wavelet compression and decompression using the methods of FIG. 3, 6 or 7 and FIG. 8.

The methods of lossy method of wrap-around wavelet compression and decompression described above do not suffer the same problems as occur when the LSBs of the wavelet coefficients are discarded (as described with reference to FIG. 2) and this can be demonstrated with reference to FIG. 10 which shows an example which uses the same wavelet as FIG. 2, i.e.

Wavelet: $A2'=A2-(A1+A3)/2$ $A3'=A3-A1$ $A1'=A1$

Inverse Wavelet: $A1=A1'$ $A3=A3'+A1'$ $A2=A2'+(A1+A3)/2$

If A1, A2 and A3 have the values as shown in example 1002 in FIG. 10, i.e. A1=1, A2=0, A3=1 (which is the same as example 202 in FIG. 2), for 1 bit precision loss (i.e. j=k−1 and in this example k=1 and j=0) this gives:

| | First part | Second part |
|---|---|---|
| A1 | 0000000 | 1 |
| A2 | 0000000 | 0 |
| A3 | 0000000 | 1 |

Applying wrap-around wavelet compression to the first part of each bit gives, for the first part of A2':

0000000−(0000000+0000000)/2=0 such that A2'=0 (as shown in example 1004 in FIG. 10). The 7-bit wrap-around inverse wavelet will reverse the process (as shown in the example 1006 in FIG. 10):

$A2=A2'+(A1+A3)/2=0000000+(0000000+0000000)/2=0$

The compression unit and decompression unit described herein may be embodied in hardware or an integrated circuit. The compression unit and decompression unit described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression unit or decompression unit configured to perform any of the methods described herein, or to manufacture a compression unit or decompression unit comprising any apparatus described herein. An integrated circuit definition dataset may be, for example, an integrated circuit description.

Therefore, there may be provided a method of manufacturing, at an integrated circuit manufacturing system, a compression unit or decompression unit as described herein. Furthermore, there may be provided an integrated circuit definition dataset that, when processed in an integrated circuit manufacturing system, causes the method of manufacturing a compression unit or decompression unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression unit or decompression unit (or a GPU comprising a compression unit and/or decompression unit as described herein) will now be described with respect to FIG. 11.

Figure 11:
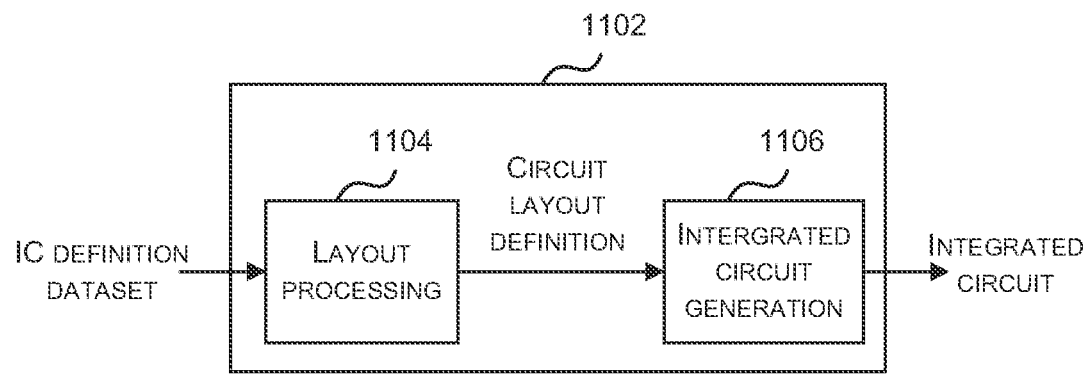
FIG. 11 shows an example of an integrated circuit manufacturing system.

FIG. 11 shows an example of an integrated circuit (IC) manufacturing system 1102 which is configured to manufacture a compression unit or decompression unit as described in any of the examples herein. In particular, the IC manufacturing system 1102 comprises a layout processing system 1104 and an integrated circuit generation system 1106. The IC manufacturing system 1102 is configured to receive an IC definition dataset (e.g. defining a compression unit or decompression unit as described in any of the examples herein), process the IC definition dataset, and generate an IC according to the IC definition dataset (e.g. which embodies a compression unit or decompression unit as described in any of the examples herein). The processing of the IC definition dataset configures the IC manufacturing system 1002 to manufacture an integrated circuit embodying a compression unit or decompression unit as described in any of the examples herein.

The layout processing system 1104 is configured to receive and process the IC definition dataset to determine a circuit layout methods of determining a circuit layout from an IC definition dataset are known in the art and for example may involve synthesizing RTL code to determine a gate level representation of a circuit to be generated (e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1104 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesizing RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression unit or decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined by the dataset or in combination with hardware defined by the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method, implemented in hardware logic, of performing lossy wrap-around wavelet compression, the method comprising:
   dividing a data value, in a block of data, into most significant bits and least significant bits;
   applying wrap-around wavelet compression to the most significant bits to produce an intermediate compression result; and
   appending a selected number of additional bits, from the least significant bits or from a value derived from the least significant bits, to the intermediate compression result to create a compressed data value.

2. The method of claim 1, wherein the selected number of additional bits are selectively appended to the intermediate compression result to achieve a target compression ratio for the compressed data value.

3. The method of claim 1, wherein the most significant bits and the least significant bits of the data value are non-overlapping.

4. The method of claim 1, further comprising outputting or storing the compressed data value.

5. The method of claim 1, wherein the selected number of additional bits is zero, one, or more than one.

6. The method of claim 1, wherein a compression result of the compressed data value is achieved by:
   appending all least significant bits to the intermediate compression result to create the compressed data value,
   comparing the compressed data value to a target compression ratio, and
   in response to the comparing, removing one or more least significant bits from the compressed data value until the compressed data meets the target compression ratio;
   or by:
   appending a most significant bit from the least significant bits to the intermediate compression result to create the compressed data value,
   comparing the compressed data value to a target compression ratio, and
   in response to the comparing, appending one or more next most significant bits of the least significant bits to the compressed data value until the target compression ratio met; and
   selecting the compressed data value closest to the target compression ratio without exceeding the target compression ratio.

7. The method of claim 1, further comprising, prior to the appending the selected number of additional bits:
   determining whether the intermediate compression result satisfies the target compression ratio; and
   in response to determining that intermediate compression result does not satisfy the target compression ratio, updating the number of least significant bits and repeating the dividing, applying and appending steps.

8. The method of claim 1, further comprising generating a data value derived from the least significant bits by compressing the least significant bits using a compression scheme which is not wrap-around wavelet compression;
   wherein one or more bits from the data value derived from the least significant bits is selectively appended to the intermediate compression result to create the compressed data value.

9. The method of claim 8, wherein generating the data value derived from the least significant bits comprises logically combining the least significant bits of the data value with an equal number of the most significant bits from the data value.

10. The method of claim 9, wherein the logical combining uses an XOR logic function.

11. The method of claim 1, wherein the block of data is a block of digital image data and wherein the data value comprises a data value for a pixel.

12. A method, implemented in hardware logic, of performing lossy wrap-around wavelet decompression, the method comprising:
    receiving a compressed data value comprising most significant bits and least significant bits;
    dividing the compressed data value into the most significant bits of the compressed data value and, where the number of the least significant bits of the compressed data value is not zero, the least significant bits of the data value;
    applying wrap-around wavelet decompression to the most significant bits of the compressed data value to generate an intermediate decompression result; and
    appending one or more bits to the intermediate decompression result to create a decompressed data value.

13. The method of claim 12, wherein there are zero least significant bits, and zero bits are appended to the intermediate decompression result.

14. The method of claim 12, wherein the number of bits appended to the intermediate decompression result is set to a value close to a midpoint between the number of bits as zeros and number of bits as ones.

15. The method of claim 12, wherein there are zero least significant bits and the appending one or more bits to the intermediate decompression result comprises:
    duplicating and appending most significant bits from the intermediate decompression result to the intermediate decompression result;
    or
    appending the decompressed least significant bits, and appending a number of zeros equivalent to the number of bits appended to the intermediate decompression result minus the number of received least significant bits.

16. The method of claim 12, wherein the number of least significant bits is greater than zero and less than the number of bits appended to the intermediate decompression result, and the appending one or more bits to the intermediate decompression result comprises:
    appending the decompressed least significant bits; and
    appending a number bits equivalent to the number of bits appended to the intermediate decompression result minus the number of received least significant bits set to a value close to a midpoint between the same number of bits of zeros and the same number of bits of ones.

17. The method of claim 12, wherein the appending one or more bits to the intermediate decompression result comprises:

defining a derived least significant bits part; and
appending the derived least significant bits part to the intermediate decompression result.

18. The method of claim 17, wherein defining a derived least significant bits part comprises:
   decompressing the compressed least significant bits using a decompression scheme which is not wrap-around wavelet compression.

19. The method of claim 17, wherein defining a derived least significant bits part comprises:
   logically combining the least significant bits of the least significant bits of the data value with the number of bits appended to the intermediate decompression result of the most significant bits from the intermediate decompression result.

20. A non-transitory computer readable storage medium having stored thereon a computer readable dataset description of an integrated circuit that, when processed in an integrated circuit manufacturing system, causes the system to manufacture an integrated circuit operable to perform lossy wrap-around wavelet compression by:
   dividing a data value, in a block of data, into most significant bits and least significant bits;
   applying wrap-around wavelet compression to the most significant bits to produce an intermediate compression result; and
   appending a selected number of additional bits, from the least significant bits or from a value derived from the least significant bits, to the intermediate compression result to create a compressed data value.

* * * * *